United States Patent [19]

Wellman et al.

[11] 4,271,787

[45] Jun. 9, 1981

[54] DISPOSABLE CONTAINER WITH LITTER FOR ANIMALS

[76] Inventors: Gary L. Wellman; Carl P. Wellman; Naomi M. Wellman, all of 829 Orange St., Yuba City, Calif. 95991

[21] Appl. No.: 95,202

[22] Filed: Nov. 19, 1979

[51] Int. Cl.³ .............................................. A01K 29/00
[52] U.S. Cl. ....................................................... 119/1
[58] Field of Search ...................... 119/1; 206/499, 526

[56] References Cited

U.S. PATENT DOCUMENTS

| | | | |
|---|---|---|---|
| 3,085,550 | 4/1963 | Crawford | 119/1 |
| 3,198,328 | 8/1965 | Donahue et al. | 206/526 |
| 3,743,170 | 7/1973 | Riccio | 119/1 X |
| 4,171,680 | 10/1979 | Silver et al. | 119/1 |

FOREIGN PATENT DOCUMENTS 2737617  3/1979  Fed. Rep. of Germany ............. 119/1

Primary Examiner—Gene Mancene
Assistant Examiner—Robert P. Swiatek
Attorney, Agent, or Firm—Lothrop & West

[57] ABSTRACT

A plurality of self-contained feline litter boxes is housed in stacked relation within a container having peripheral upright walls. Each litter box includes a removable top cover which, when withdrawn, exposes the contained litter material. As each litter box becomes soiled, the box is removed from the container and disposed of. The cover of the subjacent box is then removed, making fresh litter material available. The upstanding walls prevent any litter material from being scattered outside the container by the feline user.

5 Claims, 3 Drawing Figures

DISPOSABLE CONTAINER WITH LITTER FOR ANIMALS

BACKGROUND OF THE INVENTION

In-home confinement of cats or other domestic animals requires the provision of an indoor litter box. Commonly, a small box or tub is filled with litter material from a supply bag. Unfortunately, owing to the physical characteristics of most litter material, a considerable amount of dust becomes airborne during this loading process. After the litter becomes soiled, both the box and litter material must be removed and the litter disposed of. Then the box itself must be cleaned, followed by reloading with new litter material. The above-recited process is an unsanitary, time-consuming, and unpleasant task for the pet owner.

The present invention addresses and solves the problems inherent in the "batch" approach to creating and maintaining a litter box. By providing a plurality of stacked, individual litter boxes within a larger walled container, the dust-causing loading procedure is eliminated. Each individual litter box is constructed from rigid paper material, saturated in pleasantly scented wax. Not only does this provide an inexpensive, disposable litter box, but also ensures that undesirable odors and liquid leakage are eliminated. Since the individual boxes are disposable after use, the onerous job of cleaning the box or tube is obviated.

SUMMARY OF THE INVENTION

The device of the invention slide-fits within an open-ended carrying case including a convenient carrying handle in order to provide easy transport to a home or vacation location. Following transport, the inner, collapsed container is withdrawn from the carrying case. Peripheral, upright walls are then formed by raising and interlocking the adjacent end and lateral edge flaps of the container.

With the walls in unfolded and locked position, the upper of the two enclosed litter boxes is made accessible. The top cover of each of the stacked litter boxes is removable. When the top cover of the upper container is removed, the enclosed load of litter is exposed. The animal gains easy access by jumping over the peripheral upstanding walls.

When the upper litter box becomes soiled, it is lifted from the container and disposed of. The lower litter box is hereby rendered accessible and made ready for use merely by removing the top cover to expose fresh litter.

By making the walled container deeper, a greater number of individual litter boxes could be accommodated. Alternatively, a new pair of litter boxes could be placed into the walled container after the first pair of litter boxes is exhausted. It is to be understood that the invention embraces these and other obvious variations which would be apparent to one skilled in the art.

SHORT DESCRIPTION OF THE DRAWING FIGURES

FIG. 1 is a perspective view showing the collapsed container partially withdrawn from the carrying case;

FIG. 2 is an exploded perspective view showing the two disposable litter boxes with the top cover of the upper litter box partially removed to reveal the enclosed litter, and with the upright walls of the container in locked position; and, FIG. 3 is a perspective view of the assembled litter box system, with the upright walls in place and the top cover of the upper litter box entirely removed and ready for use.

DETAILED DESCRIPTION OF THE PREFERRED EMBODIMENT

Figure 1:
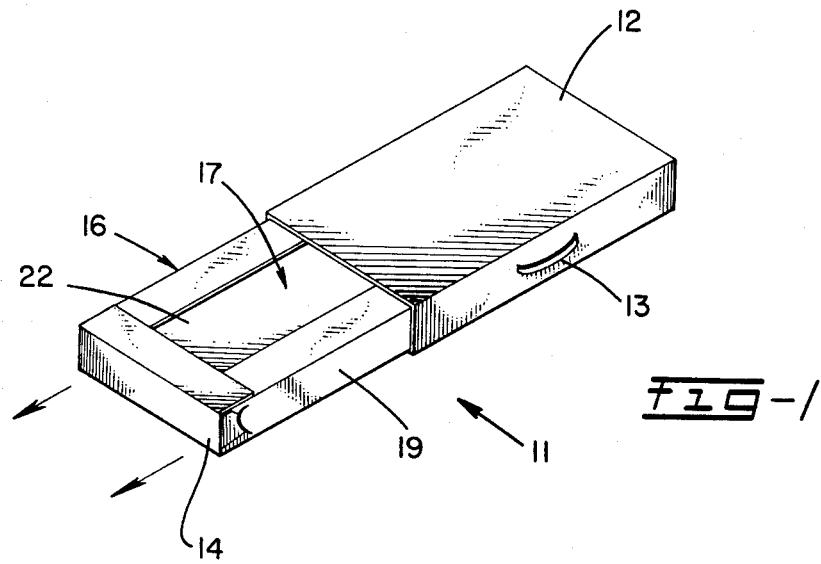

With particular reference to FIG. 1, a preferred embodiment of the invention 11 is shown in a partially disassembled state, being readied for initial set up. An open-ended carrying case 12 includes a handle 13 for convenient handling and transport. The inner dimensions of the carrying case 12 are such that a container 16 including a base 15, a pair of folding articulated end walls 14 and a pair of folding articulated side walls 19 snugly fit within the case 12 and can be slid out as shown in FIG. 2.

An upper litter box 17 and a lower litter box 18 are housed in stacked relation within the collapsable container 16. As can be seen in FIG. 1, when the container 16 is initially withdrawn from the carrying case 12, the upper portion of the folding end walls 14 and the upper portion of the folding lateral walls 19 partially enclose the top surface of the upper litter box 17.

Figure 2:
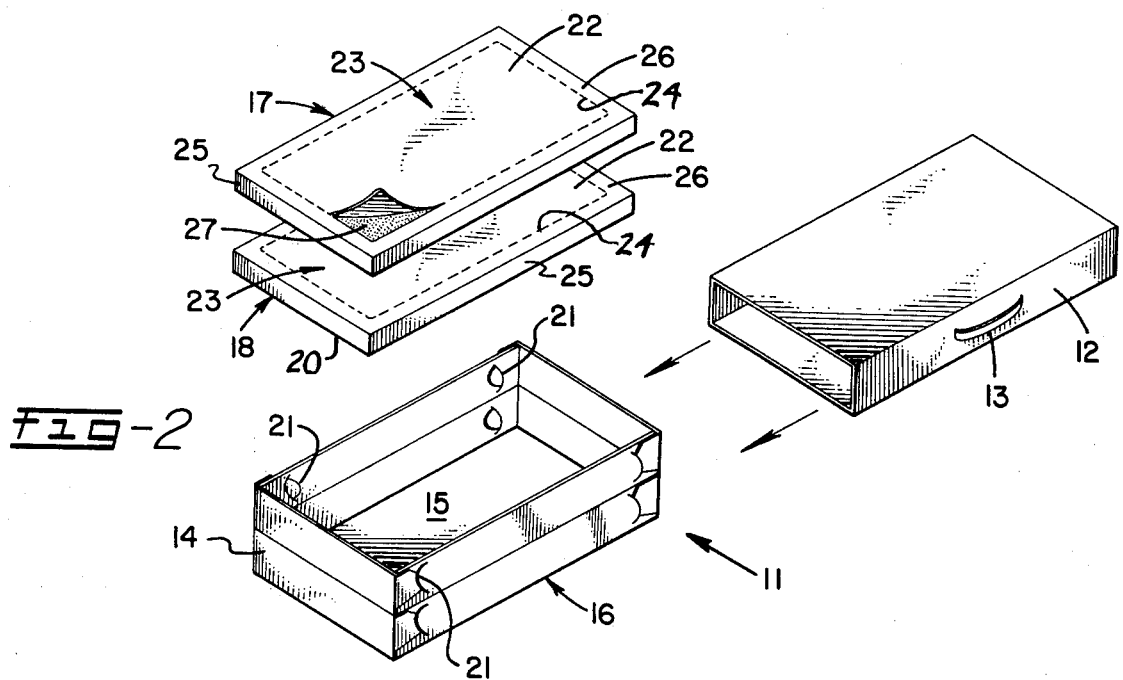
Figure 3:
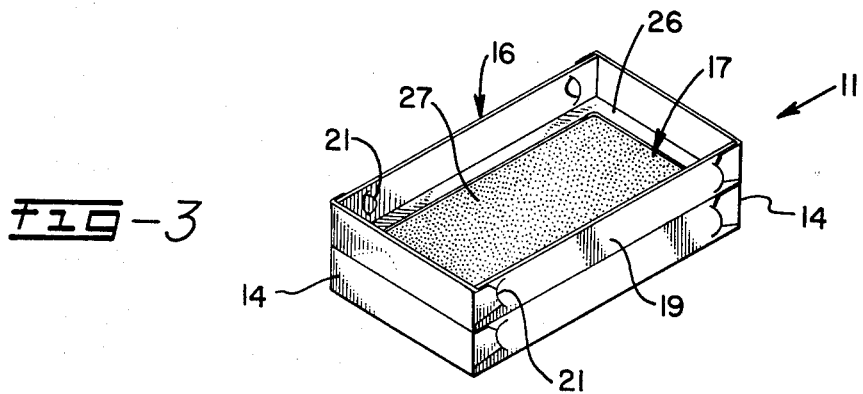

The upper portions of the articulated end walls 14 and the articulated lateral walls 19 are unfolded to assume an upright position as illustrated in FIGS. 2 and 3. Interlocking tabs 21 in the upper portions of the end walls 14 and the lateral walls 19 are joined to form a rigid peripheral wall extending upwardly from the surrounded upper litter box 17.

The height at which the end walls 14 and the lateral walls 19 are articulated is at or slightly higher than the level formed by the combined heights of the litter box 17 and the litter box 18. This permits not only the initial packaging of the unit, by any subsequent foldup and transport which may be desired.

The construction of the upper litter box 17 and the lower litter box 18 is identical. Each box includes a bottom 20, peripheral walls 25, and a removable top cover portion 22 of an overall cover 23. A line of perforations 24 encircles the cover portion 22 and defines a peripheral top margin 26. As can be seen in FIG. 2, the top cover 22 is easily peeled back to expose the litter material 27 contained within the box.

With the peripheral wall in place and the top cover portion 22 completely removed, the unit is ready for use, as can be seen most clearly in FIG. 3. The animal merely jumps over the low peripheral wall to gain access to the contained litter material 27. The upright peripheral wall, comprised of the upper portion of the end walls 14 and the upper portion of the lateral walls 19, performs a valuable function. Since the animal is likely to scratch or kick the litter material 27 during use, the peripheral wall ensures that no material will be scattered outside the container 16.

After the upper litter box 17 becomes soiled, it is withdrawn from the container 16 and disposed of. The top cover portion 22 of the lower litter box 18 is then removed, and a fresh quantity of litter material is available for use.

Litter boxes 17 and 18 preferably are made from a cheap, lightweight material, such as stiff cardboard, chipboard or the like. The inside surfaces of the boxes are treated with scented wax to eliminate leakage and offensive odors.

Although the embodiment disclosed herein uses two litter boxes 17 and 18 in a container unit, it will be realized that three or more such boxes could be incorporated in each unit sold. So also once the upright container walls are set up, several boxes purchased separately, could be installed and used in a consecutive manner.

The tedious and unsavory tasks of loading a litter box, dumping the litter, cleaning the box, and reloading the box for each batch cycle are well known to pet owners. By using a combination of specially designed packaging and at least several self-contained, and pre-loaded litter boxes, the problems inherent in previously used types of litter boxes are averted. Thus, the invention represents an effective, yet simple and economical solution to a long felt problem.

I claim:

1. A disposable container with litter for animals comprising:
   a. a container including a base and substantially upright walls about the periphery of said base; said upright walls including a pair of end walls and a pair of side walls, said pairs of end walls and side walls having a lower portion of predetermined height and an upper portion articulated to said lower portion and movable between a first folded position in which the thickness of said container is substantially equal to said predetermined height and a second unfolded position, said upper portion including means for interlocking said upright walls in said second unfolded position; and,
   b. at least two litter boxes, each of said boxes including a bottom, upstanding walls about the periphery of said bottom, and a cover connected to said walls and vertically spaced from said bottom, said cover including a removable portion, each of said boxes being substantially filled with animal litter material, said boxes being initially disposed in stacked relation within said container so that each of said boxes is opened, used, withdrawn from said container, and disposed of in consecutive fashion, the combined height of said litter boxes being substantially equal to said predetermined height so that said litter boxes are snugly confined by said upper portion of said upright walls in said first folded position thereof, said upright walls of said container being higher than the combined height of said litter boxes in said second unfolded position so as to prevent litter material from being scattered outside said container by an animal user.

2. A litter container as in claim 1 including a carrying case for transporting said container and said litter boxes enclosed therein, said carrying case comprising a hollow rectangular in cross-section cylinder having at least one open end, the size and shape of the inner dimensions of said hollow cylinder being such as slidably to accommodate said container in said first folded position and said enclosed litter boxes, said carrying case further including an exterior handle.

3. A litter container as in claim 2 wherein said container and said litter boxes are made of chipboard or like material.

4. A litter container as in claim 3 wherein the interior surfaces of said litter boxes are coated with a scented wax.

5. A litter container as in claim 4 wherein said removable cover portion of said litter box cover is defined by perforations enabling said removable cover portion to be separated readily from said litter box cover.

* * * * *